United States Patent
Bernard et al.

(10) Patent No.: US 7,072,977 B1
(45) Date of Patent: Jul. 4, 2006

(54) METHOD AND APPARATUS FOR CREATING LINKS TO EXTEND A NETWORK

(75) Inventors: Glenn G. Bernard, Merrimack, NH (US); John M. Gargasz, Hollis, NH (US)

(73) Assignee: Codem Systems, Inc., Merrimack, NH (US)

( * ) Notice: Subject to any disclaimer, the term of this patent is extended or adjusted under 35 U.S.C. 154(b) by 873 days.

(21) Appl. No.: 09/828,845

(22) Filed: Apr. 10, 2001

(51) Int. Cl.
*G06F 15/173* (2006.01)
*H04Q 7/20* (2006.01)

(52) U.S. Cl. .................................. 709/238; 455/422.1
(58) Field of Classification Search ................ 709/238, 709/217; 455/431, 562.1, 3.01, 422.1; 370/316, 370/352
See application file for complete search history.

(56) References Cited

U.S. PATENT DOCUMENTS

| | | | |
|---|---|---|---|
| 4,679,189 A | 7/1987 | Olson et al. | |
| 5,825,772 A | 10/1998 | Dobbins et al. | |
| 5,916,299 A | 6/1999 | Poppen | |
| 6,018,659 A | 1/2000 | Ayyagari et al. | |
| 6,035,178 A * | 3/2000 | Chennakeshu et al. | 455/12.1 |
| 6,047,165 A | 4/2000 | Wright et al. | |
| 6,061,562 A | 5/2000 | Martin et al. | |
| 6,108,308 A | 8/2000 | Flavin et al. | |
| 6,122,572 A | 9/2000 | Yavnai | |
| 6,307,861 B1 * | 10/2001 | Hogg et al. | 370/432 |
| 6,498,939 B1 * | 12/2002 | Thomas | 455/562.1 |
| 6,507,739 B1 * | 1/2003 | Gross et al. | 455/431 |
| 6,512,921 B1 * | 1/2003 | Hadinger | 455/431 |
| 2001/0017856 A1 * | 8/2001 | Asokan et al. | 370/389 |
| 2001/0036161 A1 * | 11/2001 | Eidenschink et al. | 370/316 |
| 2003/0016655 A1 * | 1/2003 | Gwon | 370/352 |

* cited by examiner

*Primary Examiner*—Krisna Lim
(74) *Attorney, Agent, or Firm*—Swidler Berlin LLP

(57) ABSTRACT

High bandwidth network access is extended to vehicles and passengers on vehicles. The network is extended to a vehicle by way of one or more intermediate nodes, which may be other vehicles or signal relays. In order to acquire the vehicles to which to extend the network, route data is provided to the intermediate nodes and to the vehicles. Computers on-board the vehicles and intermediate nodes determine which pairs of vehicles and intermediate nodes should establish links to form a network based on the route data and link scoring. The vehicles and intermediate nodes then control directional antennas to point at each other based on the route data and the scoring to establish the links.

38 Claims, 9 Drawing Sheets

FIG. 1A
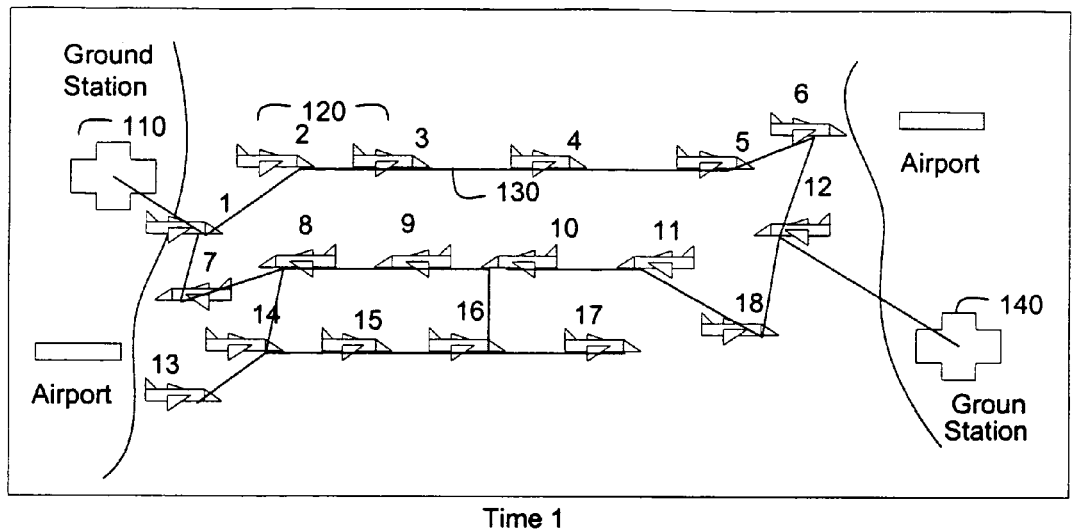
Time 1
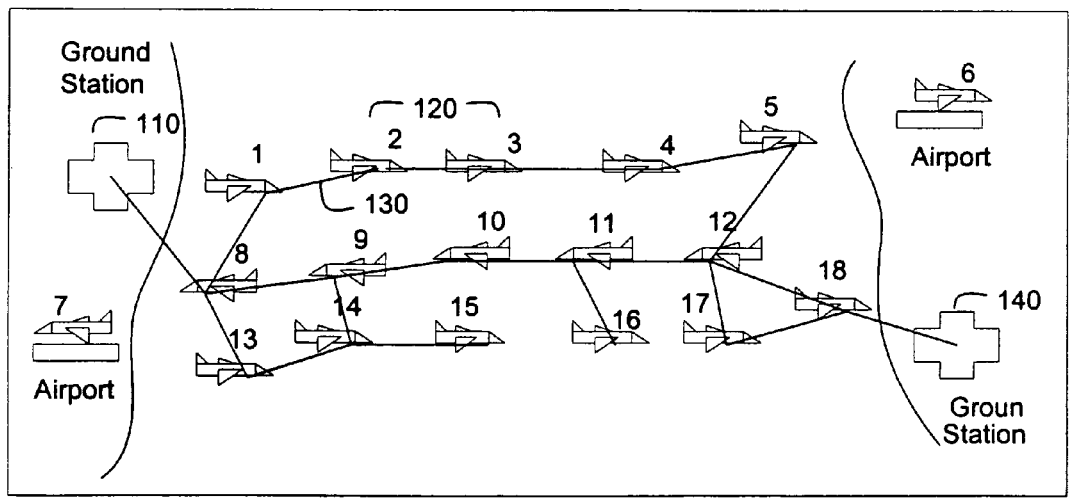
Time 2
FIG. 1B

METHOD AND APPARATUS FOR CREATING LINKS TO EXTEND A NETWORK

FIELD OF THE INVENTION

The present invention relates to communications and data processing and, more particularly, to a method and apparatus for creating links using directional antennas to extend a network.

BACKGROUND OF THE INVENTION

In recent years, there have been dramatic improvements in communications technologies that make bandwidth available for data and voice transmission. These improvements have resulted in ubiquitous networks, such as the Internet, and have brought about rapid change in the way that people communicate and exchange information. In fact, networks have become so ubiquitous that there is a frequent expectation that people are reachable via communications technologies at any time.

One of the rare times when people are unable to access data networks efficiently, particularly high-bandwidth networks, is on aircraft, ships and other vehicles where access is limited to low bandwidth access or not available at all. Notwithstanding this deficiency, people or passengers on such vehicles have a frequent need or desire to access high-bandwidth networks to gratify personal, business or entertainment needs. Personal and business needs might include receiving and sending emails, making telephone calls, sending and receiving facsimiles and accessing the internet to, for example, obtain information or make transactions. Entertainment needs may include accessing the internet and ordering and receiving personalized content such as video or music on demand services. All of these services are likely to be desired by vehicle passengers because during vehicular travel there is typically an abundance of idle time which may be devoted to consuming such services.

Conventionally, wireless telephone links have been available to passengers of vehicles. These links have been used to place telephone calls and to connect mobile computers to the internet via an internal modem in the mobile computer. Such links have conventionally been available over land but not available during trans-oceanic flights or crossings. Conventionally high-bandwidth services have not been available anywhere. Ocean crossings raise special difficulties because of the lack of access to terrestrial networks.

Accordingly, there is a need to provide access to high-bandwidth networks to passengers in vehicles such as aircraft and ships. There is a further need to provide links to high-bandwidth networks that are extendable to places where terrestrial service is not available. There is a further need to provide a network infrastructure on vehicles to facilitate delivery of high-bandwidth network services to passengers.

SUMMARY OF THE INVENTION

According to the present invention, high bandwidth network access is extended to vehicles and passengers on vehicles. The network is extended to a vehicle by way of one or more intermediate nodes, which may be other vehicles or signal relays. In order to acquire the vehicles to which to extend the network, route data is provided to the intermediate nodes and to the vehicles. Computers on-board the vehicles and intermediate nodes determine which pairs of vehicles and intermediate nodes should establish links to form a network based on the route data and link scoring. The vehicles and intermediate nodes then control directional antennas to point at each other based on the route data and the scoring to establish the links.

According to one embodiment, a method provides network access to a mobile platform, such as a vehicle, via at least one mobile node. Each mobile node includes at least two directional antennas for establishing communications links with at least two disparate nodes. The method includes transmitting route data to a mobile node and exchanging signals over links between a network interface and the mobile node. According to the method, the mobile node steers its directional antennas based on the route data to establish the links with the network interface and the mobile platform. The directional antennas may be electronically steered in the case of beam forming antennas. Alternatively, the directional antennas may be mechanically steered with the aid of a gimbal.

The mobile node may steer its directional antennas to establish direct links with at least two other mobile nodes along a path between the network interface and the mobile platform. Alternatively, the mobile node may steer its directional antennas to establish at least one direct link with the network interface and/or the mobile platform.

The route data may be transmitted to the mobile node via a direct physical connection between the mobile platform and a data-link that is coupled to a source of route data. Alternatively, the route data is transmitted from the network interface to the mobile node through an omni-directional antenna or a high-bandwidth, directional link. The links between the ground-based communications system and the plurality of mobile nodes within an area surrounding the ground-based communications system may be selected to optimize overall network performance based on an optimization criteria.

According to another embodiment of the invention, method extends the coverage area of a network that is accessible via at least one network interface node by establishing links among at least one network interface node and a plurality of mobile nodes. Each mobile node includes at least three directional antennas for creating links to other nodes. The method includes determining possible links to other nodes based on route data for the nodes and scoring each remaining link. The method further includes eliminating the lowest scoring links when the number of remaining links for the mobile node exceeds the maximum number of links permitted and aiming the directional antennas of the mobile node to create the remaining links. The method may further include computing geometric data for each possible link and eliminating occluded links based on the geometric data.

According to another embodiment of the invention, a mobile platform is provided for accessing a network via at least one network interface node by establishing links among the at least one network interface node and a plurality of mobile nodes. The mobile nodes include at least two directional antennas for creating links to other nodes. The mobile platform includes a database, at least two directional antennas and a controller. The database stores data including route data. The at least two directional antennas include control portions and the controller is coupled to the database and the directional antennas. The controller a) periodically reads the route data, b) determines links to other nodes and c) issues control signals to the directional antennas to cause the directional antennas to point at the other nodes to establish links to the network.

The mobile platform may further include an omni-directional antenna coupled to the controller. In this scenario, the controller may be further operative to a) receive route data via the omni-directional antenna from neighboring mobile platforms and b) store the route data in the database.

The mobile platform may further include a local area network coupled to the controller. The local area network is attachable to terminals for exchanging data with the network via the links. The network and links may provide the terminals access to a digital broadcast service, the Internet or a plurality of other services including electronic mail, facsimile and telephone services.

According to still another embodiment of the invention, a computer program product for causing a system on a node to establish links to other nodes is provided. The system includes network interface nodes for accessing a network and mobile nodes, each including at least three directional antennas for creating links to other nodes. The computer program product includes a computer useable medium having computer program logic therein, including:

determining means for causing a system to determine possible links to other nodes based on route data for the nodes;

scoring means for causing the system to score each link;

eliminating means for causing the system to eliminate the lowest scoring links when the number of links for the mobile node exceeds the maximum number of links permitted; and aiming means for causing the computer to aim the directional antennas of the mobile node to create the remaining links.

BRIEF DESCRIPTION OF THE FIGURES

The above described features and advantages will be more fully appreciated with reference to the detailed description and the appended figures, in which:

FIGS. 1A and 1B depict a dynamic network of aircraft linked in communication with each other and to ground stations at first and second times according to an embodiment of the present invention.

Figure 2A:
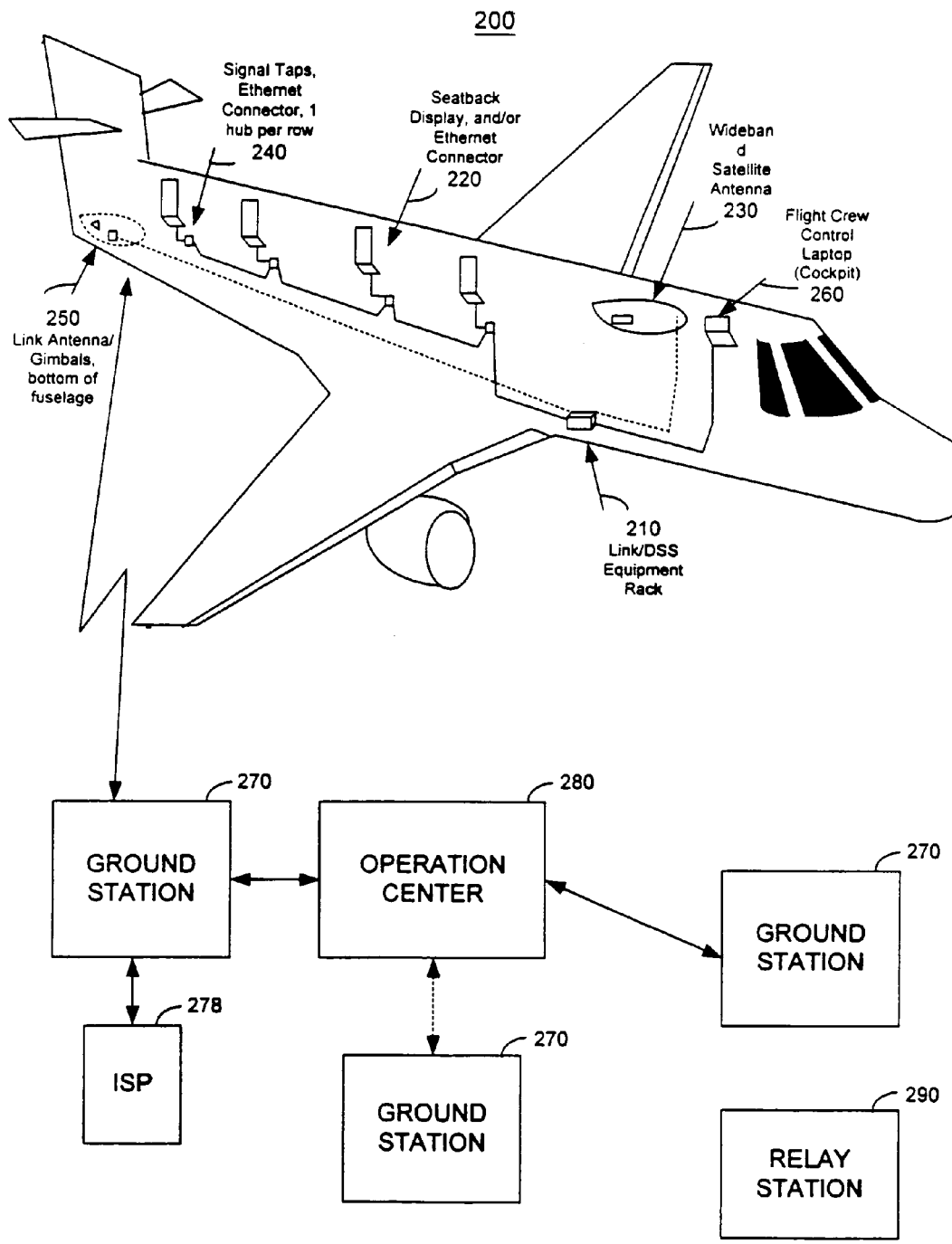
FIGS. 2A and 2B depict functional views of an embodiment of an aircraft having communications facilities and a local area network for creating and linking passengers to high-bandwidth networks according to an embodiment of the present invention.

DETAILED DESCRIPTION 1.0 Overview of the Dynamically Linked Network

The high-bandwidth network for extending network access to vehicles and passengers on vehicles is described in detail below. The description is made with reference to an embodiment in which the vehicles are aircraft. However, it will be understood that the same embodiment and concepts may be implemented in systems incorporating other vehicles including, for example, ships, automobiles, aircraft and combinations thereof.

FIGS. 1A and 1B depict a plurality of aircraft 120 within a high-bandwidth communications network 100 according to an embodiment of the present invention at two different times. The network 100 is dynamic and is comprised of communications links between ground stations 110 and 140 and aircraft 120. The network 100 also includes links between two or more aircraft 120 and between aircraft 120 and relay stations (not shown). Each aircraft 120 uses directional antennas to establish links to corresponding directional antennas on the other aircraft 120, relay stations and ground stations 110. Accordingly, each aircraft 120 may maintain multiple links to ground stations 110, 140 and/or other aircraft 120 with the number depending on the number of directional antennas that each aircraft 120 is equipped with. There may also be more than one link per directional antenna depending on whether or not link multiplexing schemes are implemented.

Ground stations 110, 140 within the network may be coupled to an operations center from which each receives route data for aircraft. The route data may include for each aircraft the known or computed positions of the aircraft including its longitude, latitude and altitude, the aircraft heading, the aircraft designation, the flight number and time information. If the position is not known for the time interval, the last known or computed time and heading of the aircraft 120 is used to compute a new position. This information may be displayed on terminals for air traffic controllers to use in monitoring air traffic. This information may also be used to steer directional antennas to establish links to aircraft when positions are known as described in more detail below.

Ground stations 110 may also include a connection to another network, such as the Internet, local and wide area networks, telephone and telecommunications networks and any other type of network. The ground stations 110 also include an antenna farm that includes many directional antennas for providing communications links between each ground station 110 and multiple nearby aircraft. The links to the ground station may be used to extend access to the Internet and other types of networks available at the ground station to many aircraft 120. In general, the network link between an aircraft 120 and a ground station 110, 140 provides high-bandwidth network access to passengers and crew on the aircraft 120.

Referring to FIG. 1A, it is apparent that an aircraft may have a direct link to a ground station 110. For example, consider aircraft 1. The aircraft is shown coupled to the ground station 110. Accordingly aircraft 1 may be directly coupled to the Internet or other networks via the ground station 110. Now, consider aircraft 7. Aircraft 7 has a link to a ground station 110 via the aircraft 1. Both aircraft 7 and aircraft 1 also have more remote links to a second ground station 140 via aircraft 2–6 and 12 in the case of aircraft 1 and via aircraft 8–11, 18 and 12 in the case of aircraft 7. Both paths to the ground stations 110, 140 may be used, for example, for network access from each aircraft 1 and 7.

FIG. 1B depicts the network of FIG. 1A at a later point in time. Referring to FIG. 1B, it is apparent that aircraft 7 has landed and has dropped out of the network 100. Aircraft 8, which was linked to aircraft 7 in FIG. 1A has severed its link to aircraft 7 and has replaced that link with a direct link to the ground station 110. Aircraft 8, being within range of the ground station 110, maintains the only link to the ground station 110. Aircraft 8, therefore, extends network access via the ground station 110 to the other aircraft shown. Aircraft 18, which has moved into range of the ground station 140 in FIG. 1B, establishes a link to the ground station 140. Accordingly, aircraft 18 extends network access via the ground station 140 to the other aircraft.

From FIGS. 1A and 1B, it is apparent that the links established between the aircraft 120 are ephemeral and are dynamically changed based on the locations of the aircraft 10. Embodiments of the invention for implementing dynamic linking, establishing the links and maximizing the efficiency of the dynamic network 100 are described in more detail below. It will be understood that network routing protocols that are implemented among the aircraft may be standard network protocols. In this regard, each aircraft may be assigned an IP address. Passenger terminals may be assigned virtual IP addresses by a DHCP server associated with the server on the aircraft. As the links between aircraft change, the network topology changes. These topology changes may be determined by routers at each node by sending network management packets along the links to discover the network topology in a well known manner. Alternatively, each aircraft server may maintain a route table that is updated as the links change. In either scenario, the network topology may be determined and exploited as the links dynamically change to facilitate packet routing pursuant to, for example, internet protocols.

2.0 Systems and Methods for Implementing Dynamic Linking 2.1 Aircraft Systems

FIG. 2A depicts an aircraft 200 having communications facilities and a local area network for creating and linking passengers to high-bandwidth networks. Referring to FIG. 2A, the aircraft 200 includes a link/DSS computer 210, network hubs 240, a plurality of passenger terminals 220, a wide band satellite antenna, such as a DSS antenna, and directional antennas 250. The link/DSS computer 210 is coupled to the other elements shown on the aircraft 200 via a local area network, serial buses, and/or direct connections. The aircraft 200 may establish links to ground stations 270 which in turn provide a path to the internet via, for example, an internet service provider (ISP) 278. The aircraft 200 establishes links via the directional antennas 250 and extends network access via the links and the local area network on the aircraft 200 to passenger terminals 220 on the aircraft 200. The aircraft 200 may also establish links to other aircraft 200 and to relay stations 290 via the directional antennas 250. Illustrative functional implementations of hardware within an aircraft 220, within ground stations 270 and within an operation center 280 are shown and described in FIGS. 2B–2D to facilitate understanding the system.

Figure 2B:
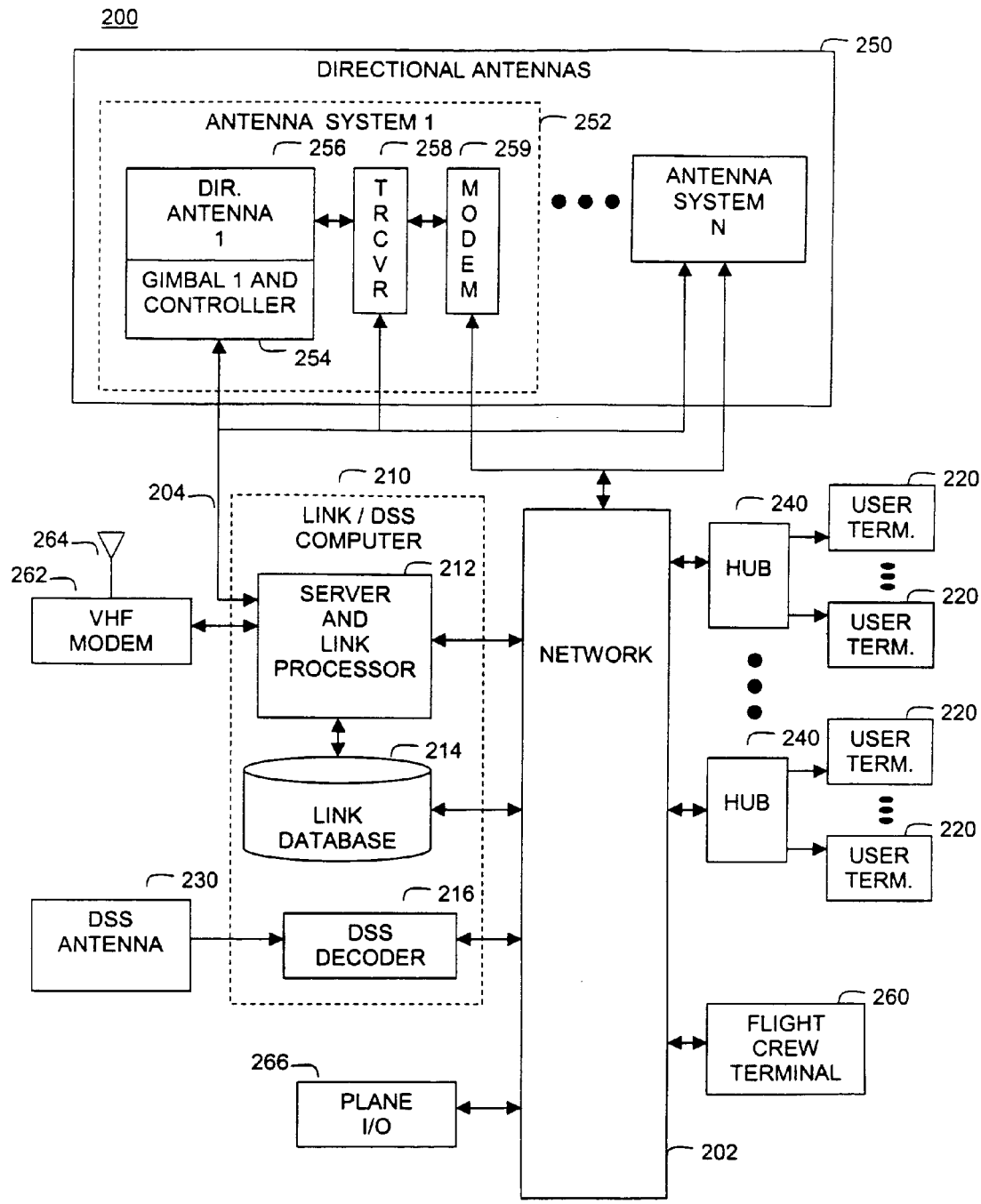

FIG. 2B depicts an illustrative functional implementation of hardware within an aircraft to permit the aircraft to operate as a node within the network 100 depicted in FIGS. 1A and 1B. Referring to FIG. 2B, the link/DSS computer 210 is coupled to the directional antennas 250, a plurality of hubs 240 and a plurality of user terminals 220 via the network 202. The network 202 may be any type of local area network including, for example, an Ethernet network, a token ring network or any other type of network. The network 202 may receive and convey signals via direct electrical paths, wireless paths or optical paths. The network 202 may also include a plurality of well known and available hardware and software including, for example, routers and hubs, for providing protocols, protocol translation, packet routing, distribution and switching.

Referring to FIG. 2B, the Link/DSS computer system 210 may comprise a rack system that includes a server and link processor 212, a link database 214 and a DSS decoder 216. The server and link processor 212 is coupled to the network 202, to a serial bus or other bus 204 for controlling the directional antennas 250, to a VHF modem 262, to aircraft I/O 266 and to the database 214. The network is in turn coupled to the directional antennas 250, the hubs 240 (which may be considered part of the network 202), to the user terminals 220 which may be mounted to seats for the use of passengers, and one or more flight crew terminals 260.

The server and link processor 212 (hereinafter the server 212) serves applications to the terminals 220 and flight crew terminal 260 via the network 202. The server also runs software processes that implement the routing algorithm depicted in FIGS. 3 and 4 through interaction with the route data stored in the database 214. The server 212 also may run software processes that control pointing the directional antennas to establish links with other nodes via the bus 204.

The database 214 stores route data for a plurality of nodes. The route data may include, for example, for each aircraft the known (or computed) positions (latitude, longitude, altitude) of aircraft, the aircraft heading, the aircraft designation, flight number, and time. When route data may also include data on ground stations and relays which do not move. Accordingly, the route data for ground stations and relays may include a ground station or relay number (or other indicia) to identify it, position information and other information which may include, for example, information on the type of networks that are available through the ground station (none are typically available through a relay), the number of directional antennas available for establishing links and any other information that may be pertinent for establishing links.

The database 214 may also include an aircraft equipment database for correlating types or models of aircraft with equipment information indicating which aircraft are equipped for establishing links according to the present invention. The database 214 may also include a flight/equipment database for correlating specific flights with equipment information for aircraft that make the flights. The database 214 may still further include an airline database which correlates specific aircraft operated by each airline with equipment information for each aircraft. Any and all of the information stored in the database 214 may be used by the server 212 to determine or calculate the position, at any given time, of local nodes that may be linked to via the directional antennas 250.

The information in the link database 214 may be populated in many different ways. The link database 214 may be populated with data through a direct connection between the database 214 or the network 202 and a master aircraft database from an operation center 280 or a ground station 270. To accomplish this, the aircraft may be coupled to a ground station 270 or the operation center 280 when the aircraft is on the ground via a direct physical connection or via a local wireless connection. Alternatively, link database 214 may be populated and/or updated through route data received from a very high frequency (VHF) omni-directional antenna 264 and corresponding modem 262 (described below) or through a link established with a ground station 270 directly or via one or more other nodes. The VHF technique may be operative without any knowledge of positions of other aircraft.

Figure 5:
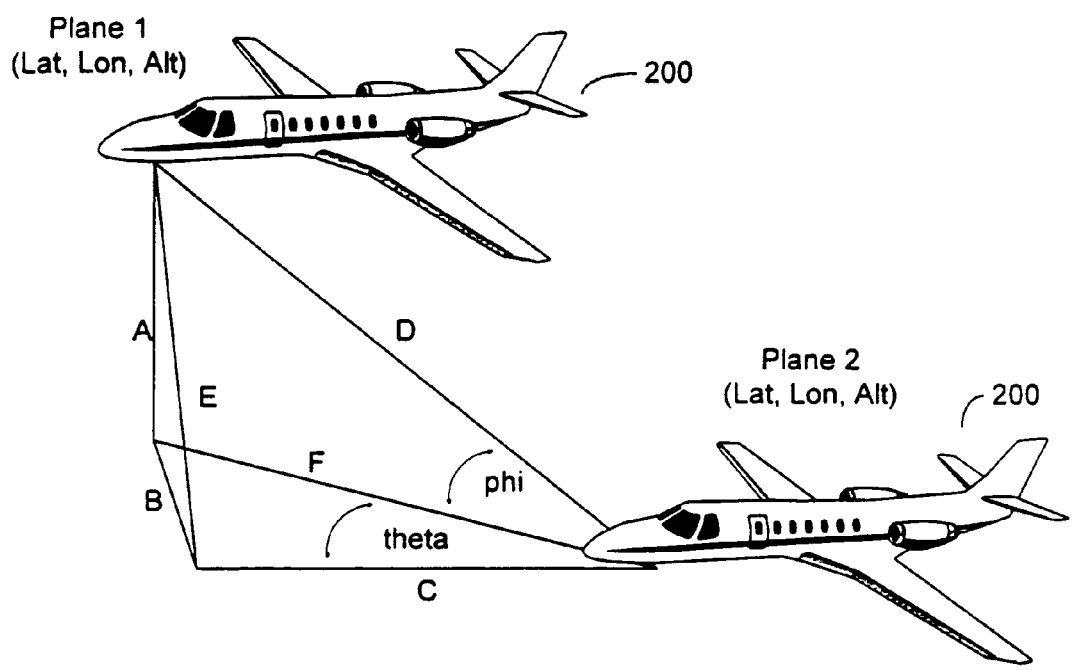
FIG. 5 depicts an orientation between two aircraft.

Also coupled to the server 212 either directly or via the network 202 is the aircraft I/O unit 266. The aircraft I/O unit 266 provides route data, flight plan and time information for the aircraft 200 to the server 212. This route data may be accessed in real time by the server 212. Alternatively, the route data may be periodically stored into the database 214. This information is used as illustrated in FIG. 5 in steering the directional antennas 256.

The DSS decoder 216 may be coupled to a DSS antenna 230 and to the network 202. The DSS decoder and antenna may optionally be used to receive DSS programming and to convey the programming to user terminals 220 via the network 202.

2.1.1 Directional Antenna Systems

The directional antennas 250 may be any type of directional antennas that are capable of being controlled by the server 212 to point at different targets based on the position and route of the aircraft 200 and the position and route of the targets. There should be at least two directional antennas per aircraft. However, three or more is preferred. The proper pointing of each pair of antenna systems 252 (one on the aircraft 200 and the other on the target node) involved in forming a link must be maintained at all times. Two angles, theta and phi (defined below with reference to FIG. 3) must be continuously computed at an appropriate update rate and the antenna systems 252 repositioned and aimed accordingly. The update rate may depend upon the geometry and the speed at which the angles between the aircraft 200 and the target nodes are changing. Alternatively, the update rate may be specified to be frequent enough to cover most relative velocity scenarios. A gimbal controller within the antenna may be self tracking as described below.

Figure 3:
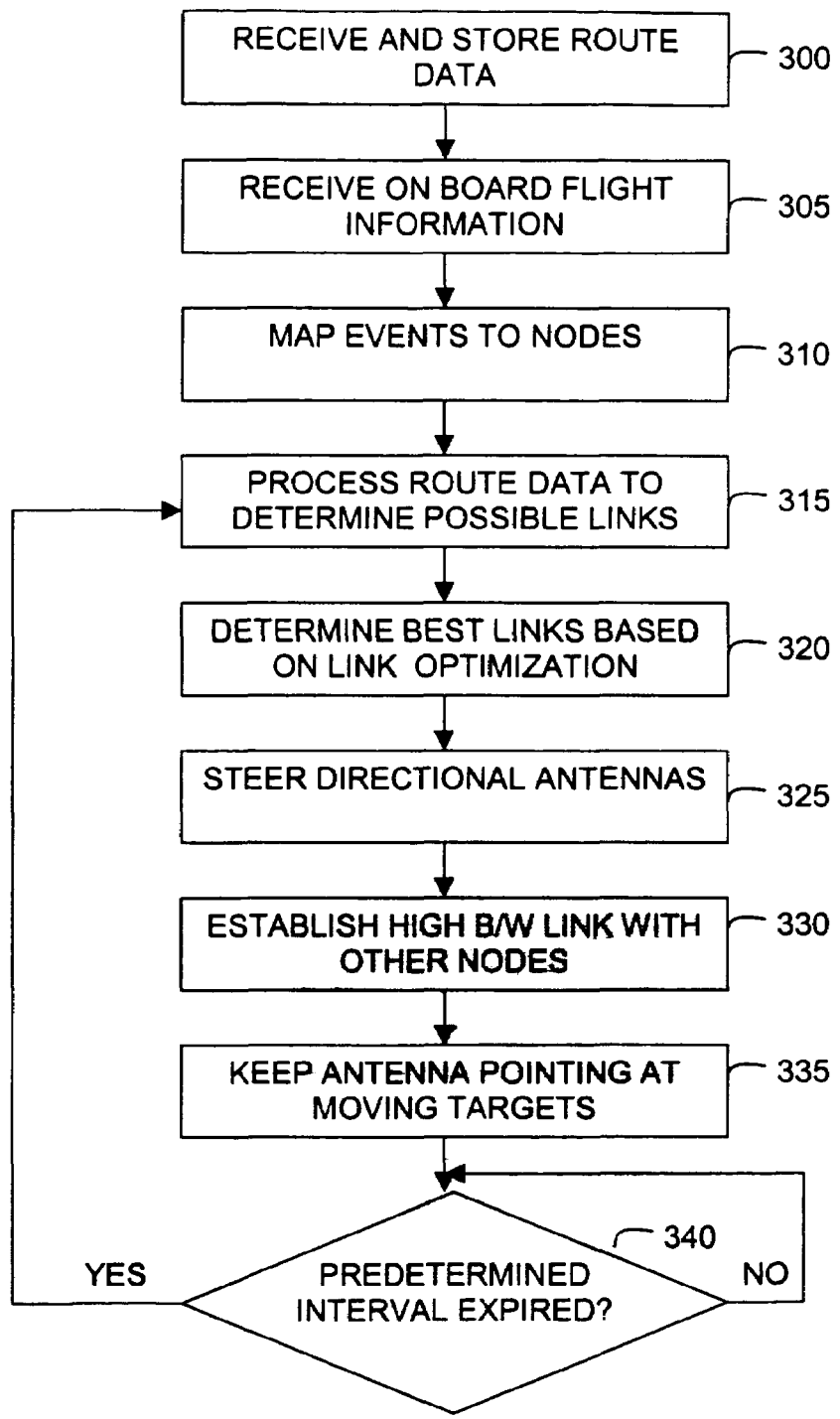
FIG. 3 depicts a method of implementing a routing algorithm according to an embodiment of the present invention.

FIG. 3 depicts two aircraft 200 and aspects of the relative geometry between the aircraft 200 to illustrate how the angles theta and phi are determined. In the case of the air to ground link, the ground station is considered to be an aircraft that is at zero altitude and fixed latitude and longitude coordinates, but all other aspects of the geometry are identical.

Referring to FIG. 3, theta and phi angles must be computed for aircraft 1 to aircraft 2, and likewise aircraft 2 to aircraft 1. The simple example below shows what is known and what must be computed. For simplicity, the quadrant and signs are ignored.

Known information:

Angle AB=90 degrees

Angle BC=90 degrees

Angle AF=90 degrees $A = Alt2 - Alt1$

Lat1, Lon1, Alt1, Lat2, Lon2, Alt2

Derived information:

$D = Range(Lat1, Lon1, Alt1, Lat2, Lon2, Alt2)$ $E = Range(Lat1, Lon1, Alt1, Lat1, Lon1, Alt2)$ $F = Range(Lat1, Lon1, Alt2, Lat2, Lon2, Alt2)$ $B = sqrt(sqr(E) + sqr(A))$ $C = sqrt(sqr(B) + sqr(F))$ $B = F * sin(theta)$ $A = D * sin(phi)$ Phi=arcsin(A/D): Angle DF (elevation to aim feed)

Theta=arcsin(B/F): Angle CF (bearing to aim pedestal and feed, must be corrected for quadrant)

When updating the theta and phi information for each antenna system 252, new latitude, longitude and altitude data may be derived based on heading information stored in the database 214 for the aircraft 200 or real time information obtained, for example from the link established between the pair of aircraft 200 or via the VHF antenna 264.

Each antenna system 252 may include a directional antenna 256, a gimbal 254 a transceiver 258 and a modem 259. The directional antenna may be a dish or any other type of antenna that is capable of pointing a beam at a target. The gimbal 254 is mechanically coupled to the directional antenna 256 and includes a controller that controls the antenna pointing direction based on the angles theta and phi determined as described above.

In this regard, the gimbals 254 are coupled to the server 212 which performs the theta and phi determination and sends control signals to the gimbals 254 over the bus 204 to move the directional antenna accordingly. Alternatively, the raw theta and phi information may be provided to the gimbal 254 which may include its own control circuitry for moving the directional antenna to the appropriate position based on the theta and phi information. In this scenario, the server may provide theta and phi information and trajectory information. The controller in the gimbal 254 may use the theta, phi and tragectory information to steer the directional antenna between link calculation periods. In still other embodiments, the directional antenna may constitute a beamformer which may be electronically steered and pointed without need for mechanical steering from the gimbal 254. In this embodiment, the gimbal 254 may be replaced with electronics for pointing the beam former electronically based on the theta and phi angles.

The directional antenna also includes a feed coupled to a transceiver 258. The transceiver 258 transmits signals to other nodes through the feed and the directional antenna 256. The transceiver 258 similarly receives signals from other nodes through the feed and the directional antenna 256. The transceiver may down convert signals received from the directional antenna and provide the down converted signals to the modem 259 in a well known manner. Similarly, the transceiver may up convert signals received from the modem and transmit the up converted signals using the directional antenna 256.

The modem 259 is coupled to the transceiver 258 and the network 202. The modem receives down converted signals and applies the appropriate protocols to convert the signals received into network protocols and transmits data derived from the signals via the network 202 to the appropriate user terminal 220, flight crew terminal 260, database 214 and/or server 212. Similarly, the modem 259 converts data received from the network into appropriate protocols and signaling techniques for transmission over the directional antenna via the transceiver 258.

2.1.2 VHF Antenna/Modem Implementations

The VHF antenna 264 is coupled to a VHF modem 262 which in turn is coupled to the server 212 as described above with reference to FIG. 2B. The VHF antenna is omni-directional. Accordingly the aircraft may receive information about the position of other nodes in relation to it via the VHF antenna without knowledge of the positions of the other nodes. Similarly, the aircraft 200 may transmit its position via the VHF antenna to other nodes without knowing the location of the other nodes. The VHF antenna may be designed to have a limited range such as 200 to 400 miles and may receive route data from other nodes within that range. Similarly, the aircraft 200 may transmit its own route data to other aircraft within the 200 to 400 mile range.

The VHF modem 262 exchanges data with the server 212 which may include route data that is further exchanged with the database 214. The VHF modem 262 also receives and transmits signals via the VHF antenna according to one or more protocols. For example, the modem 262 may implement a multi-channel narrow band scheme, such as Frequency Division Multiplexing (FDM), a Code Division Multiple Access (CDMA) scheme, a Time Division Multiple Access (TDMA) scheme, or a VDL mode 2 or mode 4 (VDL/4) scheme such as that which is being considered for European and US markets.

The power output of the modem 262 may be adjusted to provide a certain range over land and a larger range over large bodies of water. The range may be, for example, 200 miles over land and 400 miles over the ocean. The range may be dynamically adjusted from, for example, between 1 and 400 miles.

The VHF transceiver range and capabilities may be used to enable all aircraft in a certain radius to know about all other aircraft in range primarily for navigation and safety reasons. According to VDL/4 system parameters, the effective bandwidth is 28.975 MHz, and channels are 25 KHz wide, which yields an effective maximum channel capacity of 1159 channels, or simultaneous aircraft in the 200 mile range. The modulation used is GFSK, which is a bandwidth efficient modulation for narrow band communications systems in VHF.

A VDL/4 modem 262 may provide a local area network connection, such as an Ethernet port, for connection to the network 202 and provides the aircraft identification other accompanying route data to the server 212 and database 214. The server 212 and/or the VHF modem 262 itself operate to store the route data from the VHF modem 262 into the link database 214. The VDL/4 modem 262 may maintain communications with up to 1159 aircraft simultaneously and thus provide route data for all of these aircraft to the link database 214.

As an alternative to VDL/4 systems, any other omnidirectional communications system may be deployed which also maintains a slotted scheme, either in the frequency domain (like VDL/4's FDM scheme) or in the code domain, as in a CDMA scheme, or in a time domain, as in a TDMA scheme. The physical layer modulation is not important, so long as all aircraft within the network 100 use the same scheme and the desired range is achieved.

To avoid conflicts between aircraft, the modem 262 may find an empty slot (in frequency, code, or time space). Once an empty slot is identified, it may transmit identity and position information and other route data about the aircraft. The information transmitted specifically may include: tail number, flight, vendor, position (latitude, longitude, altitude), time, heading, and whether the aircraft is on the network. Thus, an aircraft message may comprise at the low end approximately 48 bytes, or 384 bits. Additional information may be included in the message, however.

To learn about the other aircraft in the vicinity, an aircraft 200 or ground station 270 demodulates the occupied channels. A properly chosen channelization enables the simultaneous demodulation of all channels using DSP-based spectral domain demodulator techniques. Since the message is time tagged, the amount of time that is required to transmit it is not important. Accordingly, the time from the message may be used as the time component associated with the aircraft information portion of the route data. If a FDM approach is used, an FFT-based search scheme can be employed, and frequency channelization using a DSP demodulator may be utilized to enable high-speed frequency slot assignment and occupation. Similar techniques may be employed in the CDMA case.

Alternatively, a TDMA scheme may be employed, where each aircraft is assigned a slot. A control slot in the VHF modem 262 of each node may be used to allow new aircraft or nodes to find an unoccupied slot, indicating by the control channel their intention to use a particular slot. Thereafter, assuming no conflicts, the new aircraft may use the slot. This technique prevents two aircraft from simultaneously using the same slot. This is made possible because all aircraft monitor the control slot, and if transmission is occurring on that slot, simply listen, and do not try to transmit to the control slot. In this way, each aircraft may broadcast its presence and find and use a unique slot in the system.

One problem with the above approach is that ground stations with approximate 200 mile spacing may give rise to overlapping slot assignments. To overcome this problem, a couple of different approaches are available. One solution is to hard code slot assignments into the aircraft. This may or may not be practical depending on the number of slots available to the VHF modem 262 and the number of aircraft in the network 100. The limitation of this scheme is that enough slots must be allocated initially to accommodate any future growth in the system, or the system must be defined with sufficient flexibility to allow future upgrades. The total number of flights in any day presently is around 80000. Thus, for an FDM approach, if a 10 MHz bandwidth is utilized, channelization is 125 Hz. Thus, data transmission rates would be less than 125 bits/second for a MSK or BPSK modulation scheme. Thus, the required time to transmit would be 384/125=3.072 seconds. Using a TDMA scheme, if the maximum desired number of slots were 80000, then the number of time-domain slots (pulses) would be 160000, if a 50% guard time were used on either side of the information pulse. Thus, the data rate would be 10 MHz/160 k=62.5 bits/sec using MSK or BPSK modulation. The required time to transmit would thus be 384/62.5=6.144 seconds. Once an aircraft id message is transmitted, there can be a simple idle pattern, and the message can be repeated (with current position and heading information).

Use of overlapping slots, where slots are arbitrarily assigned to a aircraft. Slots that were assigned to a aircraft, can be de-assigned when the aircraft goes out of range, and are thus available for reassignment by aircraft coming into range. This scheme does not guarantee available slots in congested areas, such as in the vicinity of Boston, Chicago, New York, London and Paris, unless an adequate number of initial slots are chosen. An adequate number might be 3000 aircraft in a given 400 mile radius of one of these major airport cities, and thus as many as 3000 slots might be required. The exact number would be based on counts of maximum air traffic with a margin to accommodate future growth in air travel which is expected to rise by 40% by 2010. One advantage of this scheme is significantly higher data transmission rates, or narrower bandwidth of operation to reduce cost and complexity of the VHF radio.

Since the number of dynamically linked aircraft in the air at any time may be much less than 80000, say 5000 to 10000, a set of overlapping slots could be utilized which would be coupled to the aircraft flight plan (area of operation) and schedule. This would effectively reduce the total number of fixed assigned slots and would require a specific slot assignment scheme based on a flight plan or schedule. The slot assignment may be determined based on the flight plan by the server 212 or provided to the server 212 prior to departure when the pilot enters flight plan information into the flight control computer. From the flight plan and time schedule, a slot assignment algorithm may determine the appropriate slot.

2.2 Ground Station Systems and Relay Systems

Figure 2C:
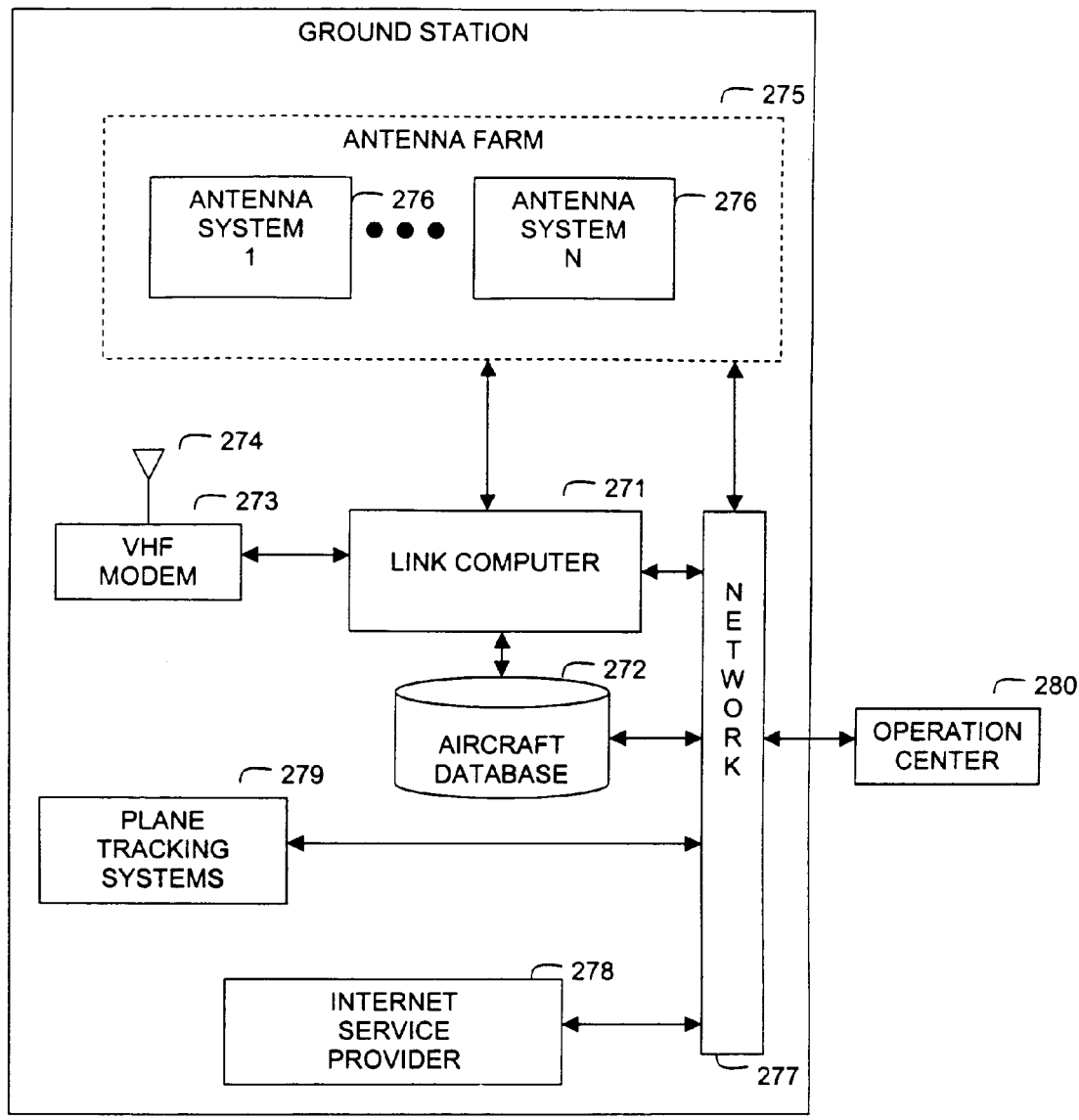
FIG. 2C depicts a functional block diagram of a ground station according to an embodiment of the present invention.

FIG. 2C depicts a functional view of a ground station system 270. The ground station system 270 includes a link computer 271 coupled via a network 277 or bus an antenna farm 275, a VHF modem 273, an aircraft database 272, aircraft tracking systems 279, an internet service provider 278 and an operation center 280.

Figure 4:
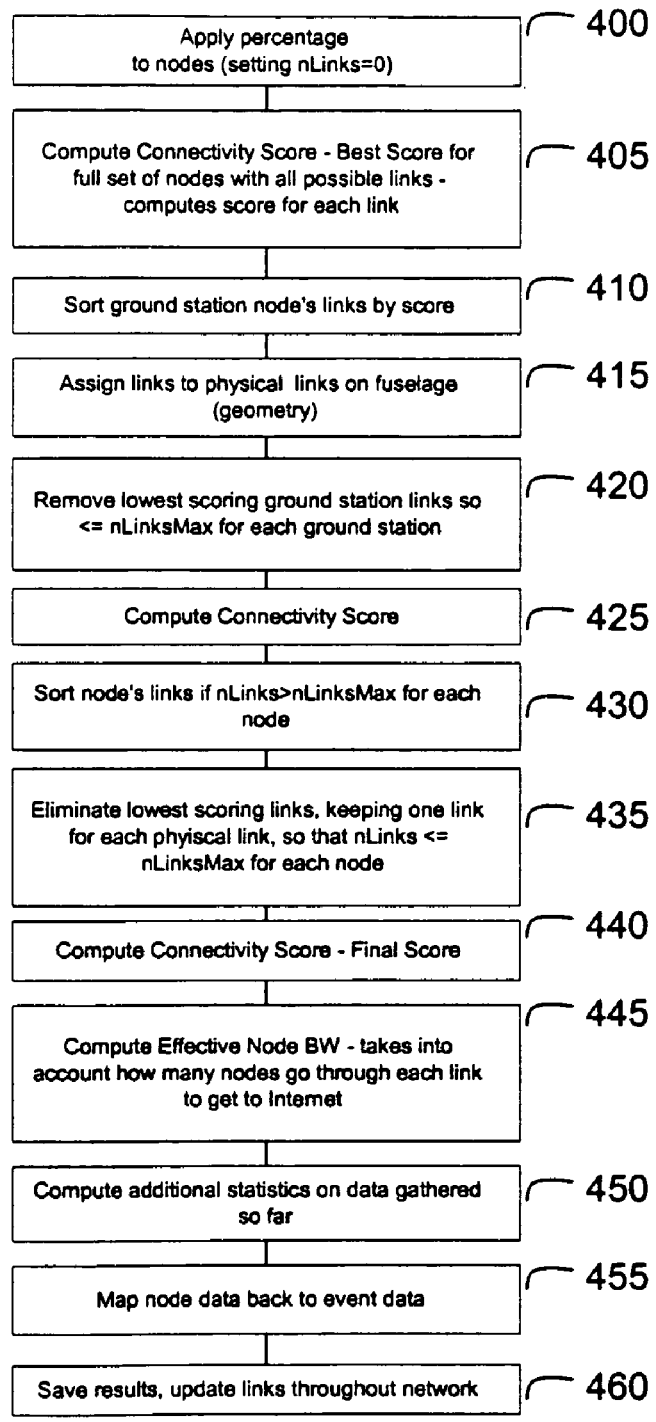
FIG. 4 depicts a method of determining and optimizing links according to an embodiment of the routing algorithm.

The link computer 271 implements the link routing algorithm based on the route data for aircraft 200 stored in the database 272 as described in FIGS. 3–4 to steer the antenna systems 276 within the antenna farm 275 to create links to aircraft 200 in the vicinity of the ground station 270. The technique for accessing route data and steering the directional antennas within each antenna system may implemented in the same manner as described above with reference to FIG. 2B. However, in this embodiment, the ground station has a fixed longitude, latitude and altitude and steers. Accordingly, the directional antennas of the ground station's antenna farm are steered to reflect movement of aircraft 200 relative to the fixed ground station 270.

The link computer 271 receives up to date route data for aircraft 200 from the operation center 280. The route data is in turn stored in the aircraft database 272. The route data may in turn be transmitted via the VHF modem 273 and antenna 274 to local aircraft within VHF range of the ground station 270. Alternatively, the route data may be transmitted via one or more antenna systems 276 to aircraft within range of the ground station 270. The VHF 273 modem may be the same modem as described above for the aircraft 200 implementation in FIG. 2B.

The aircraft tracking systems 279 may be terminals and computer systems used by air traffic controllers to track aircraft positions and bearings. The aircraft tracking systems 279 may receive route data for aircraft 200 from the aircraft database 272.

The internet service provider (ISP) 278 may be a telecommunications service provider that acts as a gateway to provide access to the Internet to the operator of the ground station. The ISP 278 typically will include a network connection to route information and commands received from aircraft links via the directional antennas 276 and network 277 to specified point on the Internet. Similarly, the ISP 278 transmits data from remote servers on the Internet via the network 277 and the antenna farm 275 to aircraft linked to the ground station 270 via direct or indirect links as shown in FIGS. 1A and 1B. In addition to, in lieu of or by virtue of the Internet access, other telecommunications services may be made available to passengers on the aircraft via the connections to the network 277 of the ground station 270 and links to aircraft 200.

A relay station may have the same configuration of an aircraft. Relay stations convey signals received to other nodes and may be positioned advantageously within a network to facilitate preventing "dead" areas in which aircraft cannot establish links. Relay stations may have the same configuration as aircraft systems (without the passenger terminals) but may include additional directional antennas depending on congestion in the vicinity of each relay station.

Figure 2D:
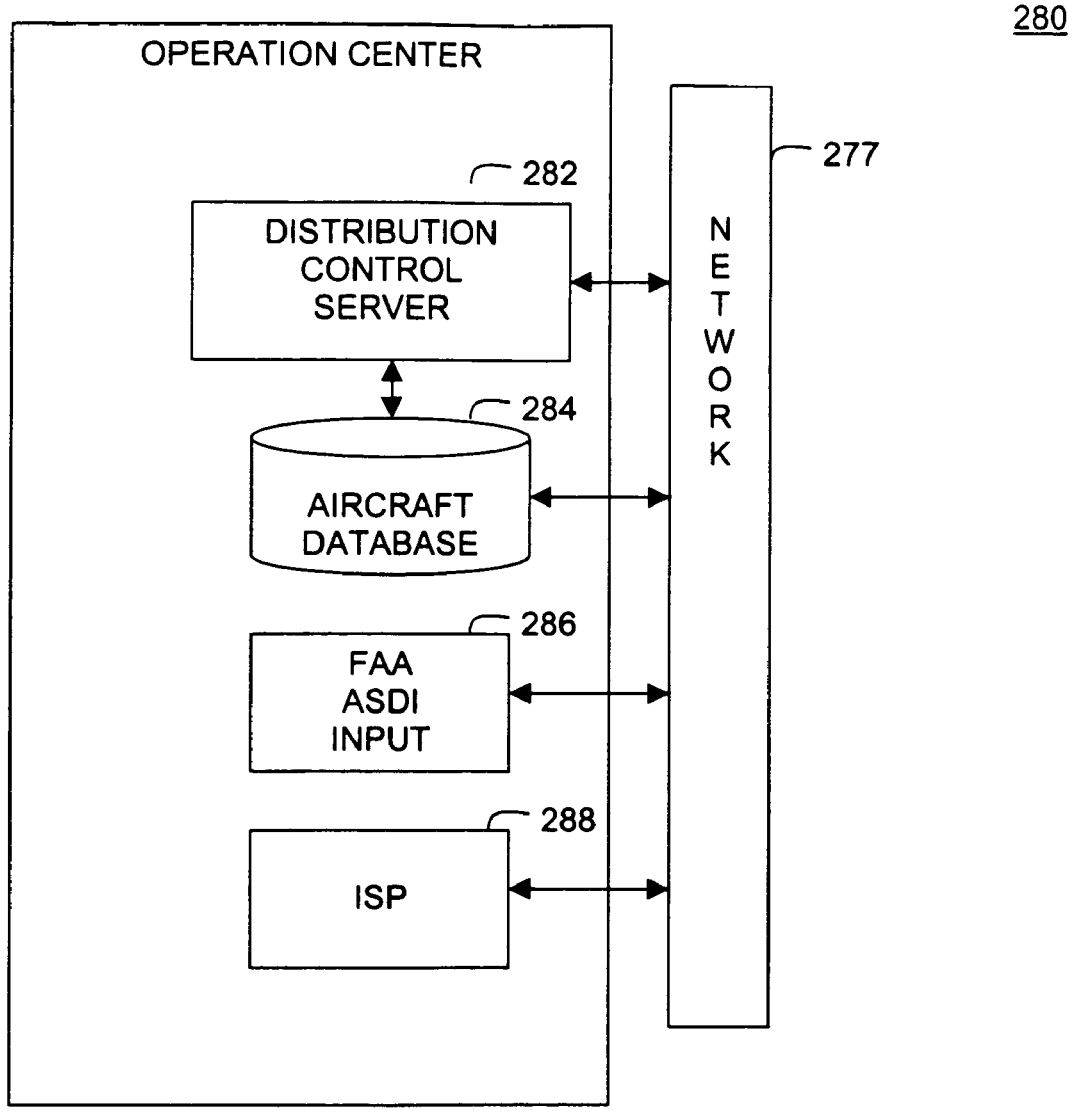
FIG. 2D depicts a functional block diagram of an operation center according to an embodiment of the present invention.

FIG. 2D depicts a functional implementation of an operations center 280 according to an embodiment of the present invention. Referring to FIG. 2D, the operation center 280 may include a distribution control center 282 coupled over a network to an aircraft database 284, an aircraft situational display initiative (ASDI) server 286 and an ISP 288.

The network depicted in FIG. 2D may include the interconnected servers, routers, bridges and hubs collectively known as the Internet. The ASDI server 286 may be implemented, for example, as a remote server which is coupled to radar stations for tracking and accumulating radar data on aircraft. Such servers and provision of ASDI data over networks such as the Internet are well known. Accordingly, ASDI data may be received from the ASDI server 286 and stored in the aircraft database 284. The distribution control server 282 synchronizes the aircraft database 284 with the aircraft databases 272 in the ground stations 270 so that the ground stations 270 have current information. The ASDI data may be maintained by the Federal Aviation Agency, European counterpart agencies or other parties.

In addition, an ISP 288 may be connected to the network 277. This may be accomplished where it is desirable to provide access to the Internet or other telecommunications services through the operations center 280 rather than through each individual ground station 270.

3.0 The Routing Algorithm and Processes

FIG. 3 depicts a method of establishing links among aircraft 120, ground stations 110 and 140 and relay stations. These elements are each also referred to as nodes, mobile nodes and platforms. The steps of the method are performed periodically and constitute the "routing algorithm". The algorithm can be run as a standalone engineering tool to evaluate different placements and geometries of directional antennas on the fuselage of aircraft, relay ground station placement, ground station (connected to the Internet) placement, and air traffic patterns. Alternatively, the routing algorithm may be implemented within one or more nodes within the dynamic network 100 to perform the acquisition, maintenance and severance of links among the nodes.

Referring to FIG. 3, in step 300, a node implementing the method depicted receives and stores in a database route data providing information about other aircraft. The route data may specify information about aircraft 120 in close proximity to the node. Alternatively, the data may specify information about all aircraft 120 known to an operations center 280. The route data is stored within a database of the node. The route data may include for each aircraft the position of the aircraft in longitude and latitude, the altitude of the aircraft, and the time associated with the position. The route data may also include the aircraft heading, the aircraft designation, flight number and equipment information indicating whether the aircraft is equipped for dynamic linking.

The route data may be received through, for example, an omni-directional antenna such as a very high frequency (VHF) antenna. The route data may also be received via the links established among the directional antennas. In still other embodiments, the route data may be directly provided to the node via a direct or network connection to an operations center or a ground station.

In step 305, on-board flight information is retrieved to determine the present route data of the node performing the method of FIG. 3. This step is typically performed only on mobile nodes because in the case of ground stations and relays, the position generally doesn't change. In step 310, the node maps events to aircraft based on the route data for a given time interval. The events are simply the known (or computed) positions (latitude, longitude, altitude) of the aircraft, the aircraft heading, the aircraft designation, flight number, and time. If the position is not known for the time interval, the last known or computed time and heading of the aircraft is used to compute a new position. In the case of fixed nodes such as ground stations and most relays, the nodes are added into the map without adjusting the position data of the nodes. The ground stations and relays are treated by the routing algorithm as other vehicles, but with some different attributes. For instance, whether or not each is connected directly to the Internet, and how many links each supports is different for ground stations and relays than for aircraft. Typically, the ground stations and relays will have more directional antennas than aircraft have.

In step 315, the node processes the route data to determine all possible links among the nodes. This step checks the distance between all the nodes and the ground stations or relays. If the distance is small enough (as dictated by the effective range of the radio used to form the link) then a possible link is formed. This step also finds all possible links between aircraft as well.

In step 320, the node determines the best links to establish based on a link optimization process described with reference to FIG. 4. In step 325, the node steers its directional antennas to create the links. This step is typically performed by determining theta and phi angles as described above between the node and the link target and by causing a gimbal to adjust a directional antenna to the position defined by the theta and phi angles.

In step 330, a high bandwidth link is established between the properly oriented directional antennas of the node and one or more directional antennas on target nodes. The high bandwidth links allow Internet access to be delivered to passengers on the aircraft.

In step 335, the node maintains the directional antenna pointing at the target node. Because the node and/or the target node may be mobile, this step may be performed repeatedly in order to adjust the pointing angles of the directional antennas on the node to reflect movement over time of the node and/or the target node. Adjustment of directional antennas to maintain the link may need to be performed more frequently than the time interval for recalculating links.

In step 340, the node checks whether a predetermined time interval has expired. If so, then step 305 begins again. If not, then step 340 is repeated. The time interval may be, for example, between a few seconds and up to about 10 minutes depending on the relative velocity between nodes of the network. A more preferable time interval for aircraft networks is every 1 to 2 minutes. With the passing of each time interval, the routing algorithm is performed again. In this manner, the links are established to create the network shown in FIG. 1 for a time interval. Then, the links are re-evaluated and reformed at each subsequent time interval to create a network that reflects the changed position of nodes within the network.

FIG. 4 depicts a method of determining the best links to establish based on link optimization. The method of FIG. 4 accordingly implements step 320 of FIG. 3.

Referring to FIG. 4, in step 400 a percentage is applied to nodes. This percentage reflects the percentage of aircraft that have the link routing equipment on-board. This step is optional and is useful when the method of FIG. 3 is used to perform simulation. For example, for simulation purposes, step 400 enables some of the aircraft to not be available as nodes. This is useful for simulating rollout of a system when, for instance, only 25% of aircraft are equipped with routing equipment. This enables trades-offs to be made based on simulations designed to test network availability when the rollout is underway. In a real or live roll-out, all aircraft that are equipped are used in the network routing. If all of an aircraft link equipment is not functioning, that aircraft may be ignored in the real system.

In step 405, the node computes a connectivity score for a full set of nodes with all possible links. Here, by connectivity, we mean connectivity to the Internet, not necessarily to other aircraft. To perform this step, a score for each link is computed. A total score for all links is then determined. The higher the score for each link, the more valuable that link is to the overall network connectivity.

Step 405 is very useful for providing status and statistical information in real and simulated systems. It is not necessary, however, in a real system to implement the routing algorithm. In essence, step 405 determines the best possible score given all possible links. This score may be computed to determine the upper bound of how good the network can be for statistical analysis. The purpose of the algorithm after step 405 is to determine the reduced (or minimized) set of links that offer performance as close as possible to this best score. A reduction in performance of 1 to 10 percent is quite possible depending on conditions. This may translate to a "blackout" in Internet service of 1 to 10 percent (or more). Accordingly, keeping performance degradation due to link minimization as small as possible is the objective.

In step 410, the node sorts the ground stations node's links by score. Each ground station has only a finite number of possible links. There is no need to connect ground stations to each other. There may be a need or desire to connect relay stations to ground stations.

In step 415, the node assigns links to physical links on the fuselage. This step is important to the process of choosing physically achievable links, based on the directional antenna geometry and placement of the antenna on the aircraft, from the universe of possible links to either ground stations or other aircraft. Aircraft are outfitted with a finite set of links, typically 3. The specific manner in which these links are attached to a particular aircraft fuselage can be unique to that aircraft model or even instance. This information, the routing equipment information for each node, is stored in the database of each node. For electronically steered links, where no gimbal is involved, this issue is not as important, but for mechanically actuated gimbals, this is an important concern because gimbals cannot be aimed through the hardware of another gimbal. This means that, although five links may be possible, only three of them may be physically achievable because one or more physical mechanical gimbals may occlude the view or views of other gimbals.

Figure 6:
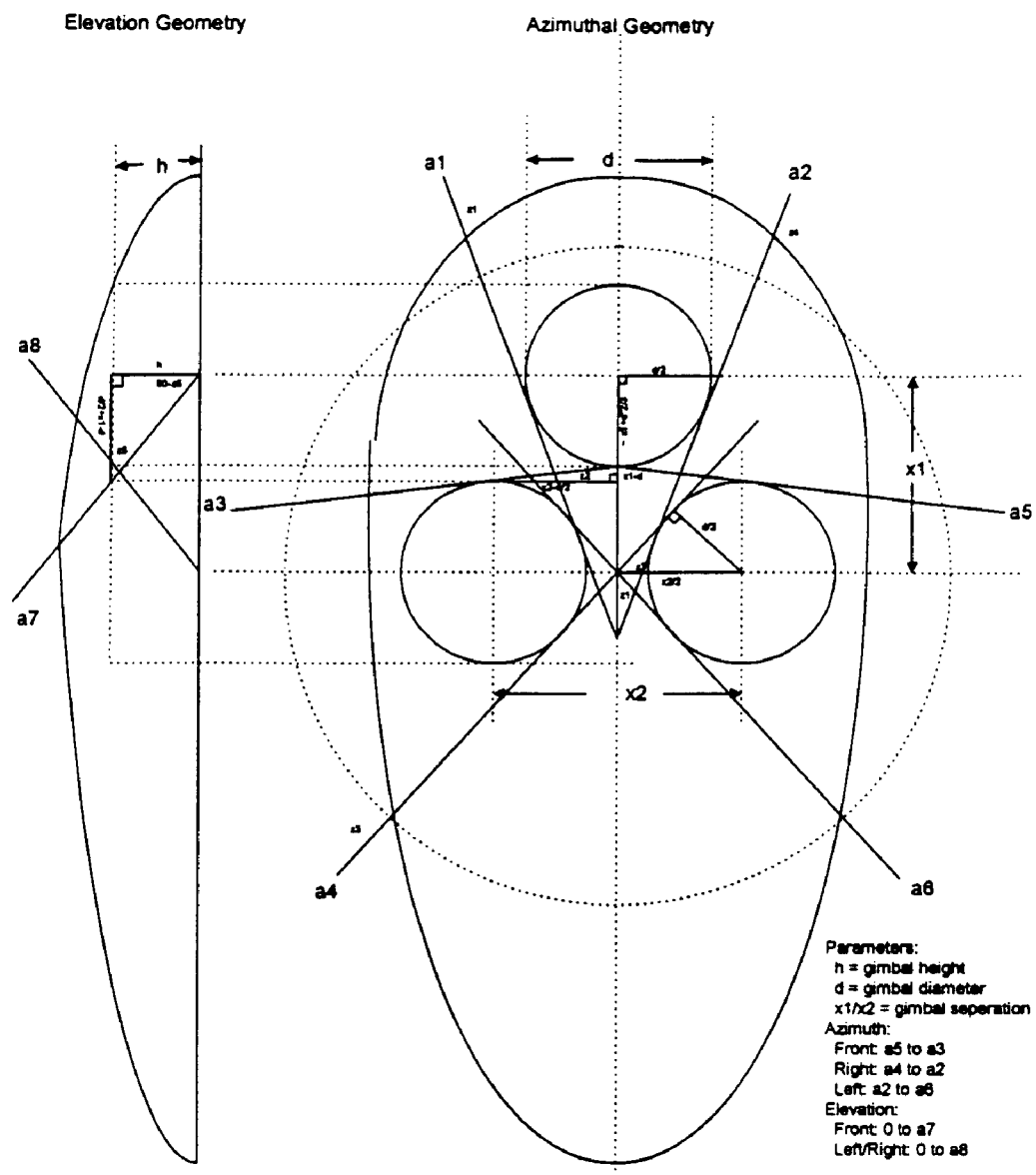
FIG. 6 depicts the geometry of the directional antennas for mounting on an aircraft according to an embodiment of the present invention.

The directional antennas may be placed on any surface of the aircraft including in the front of the aircraft, on the sides, on the rear, on the top, and on the bottom. It is also possible to place the directional antennas on the wing surfaces or tips. Some placements may be better than others. The front is already equipped with forward looking RADAR equipment. Placement on each side automatically precludes antenna visibility to the other side due to fuselage occlusion. For practical, physical, and financial reasons, the directional antennas may be grouped together either on the top or bottom of the aircraft. Alternatively, the directional antennas may be distributed over the aircraft to maximize the number of links available and minimize occlusion. An example of a popular "grouped" antenna geometry is depicted in FIG. 6.

This geometry has a number of advantages:
1. Requires only one electrical conduit hole into the fuselage.
2. Requires only one fuselage bubble to be placed on the fuselage. Each bubble must be approved, and bubbles over 6 inches high cause significant fuel economy reductions.
3. Provides good front and back coverage, as well as left to right coverage.

The distances (x1, x2, h, d) and angles (a1, a2, a3, a4, a5, a6, a7, a8, etc.) may be chosen based on design considerations. This simple layout provides good front gimbal visibility (a1–a2 degrees), left/right and back side visibility (a2–a6 degrees or a1–a4 degrees). It also provides a good elevation angle visibility from about −3 degrees to 90 degrees.

In step 420, the node removes the lowest scoring ground station links. This is the first step in the link minimization process. Given the scoring that has been done so far, and taking into account geometry, the node eliminates all non-physically realizable links due to geometric occlusions. Then, the node eliminates the lowest scoring links for each ground station's physical links, so that at most, one link remains for each physically realizable link. This can be considered reducing the possible virtual links to the best, physically achievable links for each ground station. Relays are considered to be aircraft at this step in the processing, rather than ground stations.

In step 425, the node computes a connectivity score again. This provides new scores for each remaining link, as well as finds alternative best paths from the aircraft to the ground stations. In this case, Compute Connectivity is run to compute link scores.

In step 430, the node sorts each node's links based on score if the number of possible links for that node is greater than the number of simultaneously realizable links for that node. Then in step 435, the node eliminates the lowest scoring possible links but keeps one link for each physical link so that the number of links remaining is less than or equal to the number of links physically and simultaneously achievable by the node. This can be considered reducing the possible virtual links to the physically achievable, and also minimizes the link count to the best links.

In step 440, the node computes a final connectivity score. Once again, compute the connectivity score. This is done for statistics reasons only, and is not necessary. The final score can be compared with the best score to see the overall reduction in network connectivity. Each aircraft connected contributes 1 to the final connectivity score, so a reduction of 5 means 5 aircraft did not have Internet connectivity during this interval. In this case, Compute Connectivity is run to find hops (mode 3).

In step 445, the node computes an effective node bandwidth. This step determines the effective bandwidth (a fraction of the maximum link bandwidth) that each node can theoretically achieve on average. This figure may be based on the simple assumption that, in the long term, the average bandwidth available is about the same as the number of other aircraft that are being routed through a node or a downstream node. For example, if a last aircraft is at the end of a path to a single ground station with 20 other aircraft in the path, the effective bandwidth that the last aircraft gets is $1/20^{th}$ of a link bandwidth. Likewise, if a first aircraft is the node at the other end of the path described above, with a link connected directly to the ground station, the first aircraft still achieves a link bandwidth of $1/20^{th}$ of a link bandwidth, because the other aircraft are being routed through the first aircraft.

In step 450, the node computes additional statistics on data gathered so far. This step may be used primarily for simulation although it may also be useful for real-time statistics and billing. This step computes statistics such as, for a given aircraft, the percentage of time it is connected to the Internet, the average network bandwidth available to each aircraft, or to each airline, and other Quality of Service (QoS) statistics. These are invaluable when trying to determine overall network quality improvement, such as that which results from an algorithm change. This step also provides data which may be used for generating bills based on the additional statistics gathered, such as network availability to each aircraft, network usage by each aircraft and QoS.

In step 455, the node maps the data generated back to event data. This steps maps the nodes back to the original aircraft database. In step 460, the node saves the results to the database. The updated links reflected in the event data are used as a basis for establishing new links for the predetermined time interval as shown and described in with respect to steps 325–340 of FIG. 3. Each node within the network may independently perform the methods of FIGS. 3 and 4 based on the aircraft route data in its database. For this process to be effective, the nodes should be time synchronized which may be performed via the omni-directional antennas, GPS synchronization or any other well-known technique. It also provides a log of the results for later analysis.

The compute connectivity algorithm of steps 405, 425 and 440 implements graph theory algorithms. Basically, the aircraft network routing problem can be represented using graph theory as a node and link diagram. Once reduced to this, any graph theory algorithms (such as Dijkstra's shortest path traversal algorithm) may be efficiently applied to solve the graph in terms that are relevant to the application. Dijkstra's algorithm is in a class of "greedy" optimization algorithms. Any other algorithms oriented towards graph theory problems could be utilized in it's place. The algorithm is utilized to solve the unique minimization/maximization problem associated with aircraft network routing. Dijkstra's algorithm provides a means by which the shortest path can be found from any one node to any other node, when nodes are connected arbitrarily using links, each with a certain cost associated with them. To use the Dijkstra algorithm, an adjacency matrix is created which describes the nodes and links connecting them in tabular form. The format of this table may be quite simple:

|  | Aircraft 1 | Aircraft 2 | Aircraft N | ... | Ground Station 1 |
|---|---|---|---|---|---|
| Aircraft 1 |  | 1 | 2 |  | 1 |
| Aircraft 2 | 1 |  | 3 |  | 1 |
| ... |  |  |  |  |  |
| Aircraft N | 2 | 3 |  |  |  |
| Ground Station 1 | 1 | 1 |  |  |  |

The numbers in the rows and columns indicate the cost associated with the link between the two nodes. Each node can only be connected with a single link. The adjacency matrix is symmetrical about the diagonal. In the aircraft routing application, the cost factors for each cell are critical to the link minimization algorithm.

The Compute Connectivity algorithm is used in one of three ways:

A. To find the optimal network connectivity score—basically, how many nodes are connected to a ground station node regardless of path. To compute this, a cost for each link is computed in the following way. The cost is set equal to the number of links from a particular node. Cost=sum of links for node i+sum of links for node j, if either node i or node j has >nLinksMax (the maximum number of links for the node) emerging from it, there is an additional penalty of X added to the cost. The value of X is ad hoc, but a good value is about half of the number of aircraft nodes. Basically, this cost function causes the Dijkstra algorithm to find the least congested path from aircraft to ground station as possible, not necessarily the shortest. The shortest path in many cases might cause all network traffic on a transatlantic route to be routed through one aircraft, which would provide poor network connectivity and QoS. Once the Dijkstra algorithm is run for each aircraft node, the resulting paths are stored for each node. The score is computed as being the number of aircraft nodes that can connect to the Internet. Other cost functions may be used, with various performance achievable for this application. The non-linear step function is designed to force the Dijkstra algorithm to try harder to not use those nodes which are a local nexus (center points of many nodes) and instead route around the periphery.

B. This is the same as the above, except for one additional step at the end. For each of the shortest paths (routes through the graph), a score for each link is computed that is equal to the sum of the times the particular link is traversed by the other shortest paths. In other words, the score for each link reflects how important the link is to produce the kind of network connectivity that is desired. This is a distinction from the other two schemes. The overall score is computed as being the number of aircraft nodes that can connect to the Internet, however the important information from this usage is the score/cost associated with each link.

C. To find the minimum number of hops, it is assumed that the network has already been reduced. The cost is set equal to 1 in each cell in the adjacency matrix. This forces the Dijkstra algorithm to find the shortest path from aircraft to ground station in all cases. Once the Dijkstra algorithm is run for each aircraft node, the resulting paths are stored for each node. The score is computed as being the number of aircraft nodes that can connect to the Internet.

Although specific illustrative embodiments of the present invention have been described, it will be understood by those having ordinary skill in the art that changes may be made to those embodiments without departing from the spirit and scope of the invention. For example, while the invention has primarily been described with reference to a network of aircraft, it will be understood that the network nodes may be implemented in any other vehicles including automobiles and ships. Moreover, hybrid networks may be formed in which nodes may be realized as any combination of automobiles, ships and aircraft and any other type of vehicle within the same network.

It will be further understood that the computers 210, 271, 282 and the terminals 220 and 260 may each be implemented as a general purpose computer system. The general purpose computer system may include input/output devices which may collectively comprise a display, a printer, speakers, a keyboard, a mouse or other pointing device, a speech or handwriting recognition device and any other input/output devices. The general purpose computer system may further include one or more modems or signaling devices for connection to the networks 202, 277 and the bus 204. It may also include a memory for storing program instructions and data received from the communication networks 202 and 277 and a processor, coupled to the memory, input/output unit and the modem, for executing the program instructions. Each of the methods depicted in FIGS. 3 and 4 and the methods and processes described in the text may be implemented in software as program instructions executed by the processor of a general purpose computer system. The program instructions corresponding to the methods disclosed herein may be stored within a computer usable medium, such as a hard or floppy disk, a compact disc (CD) read only memory (ROM), a ROM, a file sent over a network or other vehicle for storing and/or delivering information to a computer. The program instructions corresponding to methods disclosed herein may be uploaded to the memory by devices corresponding to the medium, such as hard disc drives and CD ROM drives and the program instructions may be executed by the processor of a general purpose computer to cause the computer to execute the steps shown and described.

What is claimed is:

1. A method of extending the coverage area of a network that is accessible via at least one network interface node by establishing links among the at least one network interface node and a plurality of mobile nodes, wherein each mobile node includes at least three directional antennas for creating links to other nodes to, the method at a mobile node comprising:
   determining possible links to other nodes based on route data for the nodes;
   scoring each remaining link;
   eliminating the lowest scoring links when the number of remaining links for the mobile node exceeds the maximum number of links permitted; and
   aiming the directional antennas of the mobile node to create the remaining links.

2. The method according to claim 1, further comprising:
   computing geometric data for each possible link; and
   eliminating occluded links based on the geometric data.

3. The method according to claim 1, wherein the network interface nodes are situated at fixed, ground stations and the route data includes geographic data for each of the network interface nodes.

4. The method according to claim 1, wherein the network interface nodes are satellites and the route data further includes latitude, longitude, altitude, time, velocity and bearing data.

5. The method according to claim 1, wherein the route data includes latitude, longitude, altitude, time, velocity and bearing data for the mobile nodes.

6. The method according claim 1, wherein at least a portion of the route data is received by the mobile node via a separate antenna from nearby mobile nodes.

7. The method according to claim 1, wherein at least a portion of the route data is received by the mobile node via a link to the network.

8. The method according to claim 1, wherein the mobile node establishes at least one link to the at least one network interface node based on the scoring.

9. The method according to claim 7, wherein the mobile node maximizes the number of links to the at least one network interface node based on the scoring.

10. The method according to claim 1, further comprising scoring the links to maximize the number of mobile nodes coupled to the network.

11. The method according to claim 1, wherein the scoring is performed iteratively to minimize the number of links and maximize connectivity to the network.

12. The method according to claim 1, wherein the scoring is performed based on a Dijkstra algorithm.

13. The method according to claim 1, wherein the mobile node is a mobile platform having a plurality of terminals coupled to the network via the links.

14. The method according to claim 12, wherein the network and links provide the terminals access to a digital broadcast service.

15. The method according to claim 12, wherein the network and links provide the terminals access to the Internet.

16. The method according to claim 12, wherein the network and links provide the terminals access to a plurality of services including digital broadcast services, the Internet and electronic mail.

17. The method according to claim 1, wherein the method is periodically repeated.

18. The method according to claim 1, wherein the method is repeated every two minutes.

19. The method according to claim 1, wherein the method is repeated upon the mobile platform nearing a boundary of direct linking to a network interface node.

20. A computer program product for causing a system on a node to establish links to other nodes, including network interface nodes for accessing a network and mobile nodes, wherein each node includes at least three directional antennas for creating links to other nodes, the computer program product including a computer useable medium having computer program logic therein, the computer program logic comprising:

determining means for causing a system to determine possible links to other nodes based on route data for the nodes;

scoring means for causing the system to score each link;

eliminating means for causing the system to eliminate the lowest scoring links when the number of links for the mobile node exceeds the maximum number of links permitted; and aiming means for causing the computer to aim the directional antennas of the mobile node to create the remaining links.

21. The computer program product according to claim 20, further comprising:

computing geometric data for each possible link; and eliminating occluded links based on the geometric data.

22. The computer program product according to claim 20, wherein the network interface nodes are situated at fixed, ground stations and the route data includes geographic data for each of the network interface nodes.

23. The computer program product according to claim 20, wherein the network interface nodes are satellites and the route data further includes latitude, longitude, altitude, time, velocity and bearing data.

24. The computer program product according to claim 20, wherein the route data includes latitude, longitude, altitude, time, velocity and bearing data for the mobile nodes.

25. The computer program product according claim 20, further comprising receiving means for causing the system to receive at least a portion of the route data via an omni-directional antenna from nearby nodes.

26. The computer program product according to claim 20, further comprising receiving means for causing the system to receive at least a portion of the route data via a link.

27. The computer program product according to claim 20, further comprising establishing means for causing the system to establish at least one link to the at least one network interface node based on the scoring.

28. The computer program product according to claim 26, wherein the scoring means maximizes causes the system to maximize the number of links to the at least one network interface node.

29. The computer program product according to claim 20, wherein the scoring means causes the system to maximize the number of mobile nodes coupled to the network.

30. The computer program product according to claim 20, wherein the scoring means causes the system to perform scoring iteratively to minimize the number of links and maximize connectivity to the network.

31. The computer program product according to claim 20, wherein the scoring means causes the system to perform the scoring based on a Dijkstra algorithm.

32. The computer program product according to claim 20, wherein the node is a mobile platform having a plurality of terminals coupled to the network via the links.

33. The computer program product according to claim 31, wherein the network and links provide the terminals access to a digital broadcast service.

34. The computer program product according to claim 31, wherein the network and links provide the terminals access to the Internet.

35. The computer program product according to claim 31, wherein the network and links provide the terminals access to a plurality of services including digital broadcast services, the Internet and electronic mail.

36. The computer program product according to claim 20, wherein the system periodically repeats executing the computer program logic.

37. The computer program logic according to claim 20, wherein the system periodically repeats executing the computer program logic method every two minutes.

38. The computer program logic according to claim 20, wherein the system repeats executing the computer program logic when a link is close to being broken.

* * * * *